United States Patent [19]

Jouppi

[11] 3,964,778

[45] June 22, 1976

[54] GRAPPLE

[76] Inventor: Eino J. Jouppi, Isabella, Minn. 55607

[22] Filed: Dec. 12, 1974

[21] Appl. No.: 531,856

[52] U.S. Cl. .................................... 294/88; 294/104

[51] Int. Cl.$^2$ ............................................. B66C 3/16

[58] Field of Search ............... 294/67 A, 67 AB, 88, 294/103, 104, 106; 214/147 G, 652, 653, 654

[56] References Cited

UNITED STATES PATENTS

| | | | |
|---|---|---|---|
| 3,119,637 | 1/1964 | Eaves | 294/104 X |
| 3,152,706 | 10/1964 | Conrad | 294/104 X |
| 3,165,345 | 1/1965 | Gardner | 294/104 X |
| 3,227,297 | 1/1966 | Kampert et al. | 294/104 X |
| 3,302,809 | 2/1967 | Eaves | 214/654 |
| 3,305,262 | 2/1967 | Lull | 294/67 AB |
| 3,583,586 | 6/1971 | Burton | 294/106 X |

*Primary Examiner*—Evon C. Blunk
*Assistant Examiner*—Johnny D. Cherry
*Attorney, Agent, or Firm*—Wicks & Nemer

[57] ABSTRACT

A grapple including a pair of stationary jaws each including a straight support portion terminating in an arcuate portion offset from the longitudinal axis of the straight support portion and having an extension substantially at the juncture of the support portion and the arcuate portion. Also included are a pair of movable jaws each having an arcuate portion terminating in an extension together with a pin pivotally mounting the extension portions of the movable jaws upon the extension portions of the stationary jaws. A hydraulic ram is connected to the upper ends of the stationary jaws and the movable jaws and means for actuating the operating means to move the jaws relative to each other.

2 Claims, 4 Drawing Figures

GRAPPLE

SUMMARY

The invention relates to an improvement in a grapple. The present grapple includes a pair of identical stationary jaws, each having a straight portion and an arcuate portion and a pair of identical arcuate movable jaws pivotally mounted thereon. The pivotal point of connection of the movable arcuate jaw with the stationary jaw is at a joint substantially where the arcuate portion and the stationary jaw join the straight portion. The construction of the jaws is such that the point of pull in a lifting operation is in close proximity to the load or object to be lifted and the travel of the movable jaws is determined by the length of the straight portion of the stationary jaws. Thus, with the construction disclosed, the degree of pivotal travel of the movable jaw relative to the stationary jaw, i.e., the amount of opening and closing of the jaw, may be selectively determined by the length of the straight portion of the stationary jaw with a given length of stroke of a single hydraulic jaw.

With applicant's construction and a given hydraulic ram if the length of the straight portion is relatively short the jaws will open more fully and close less, and if necessary not close at all, but only approach a closed position. On the other hand, applicant's construction allows less opening and greater closing where the straight portion of the stationary jaw is relatively short. In short, the construction disclosed allows for a selection of more or less travel of the movable jaw by changing the length of the straight portion of the stationary jaw.

In the drawings forming part of this application:

Figure 1:
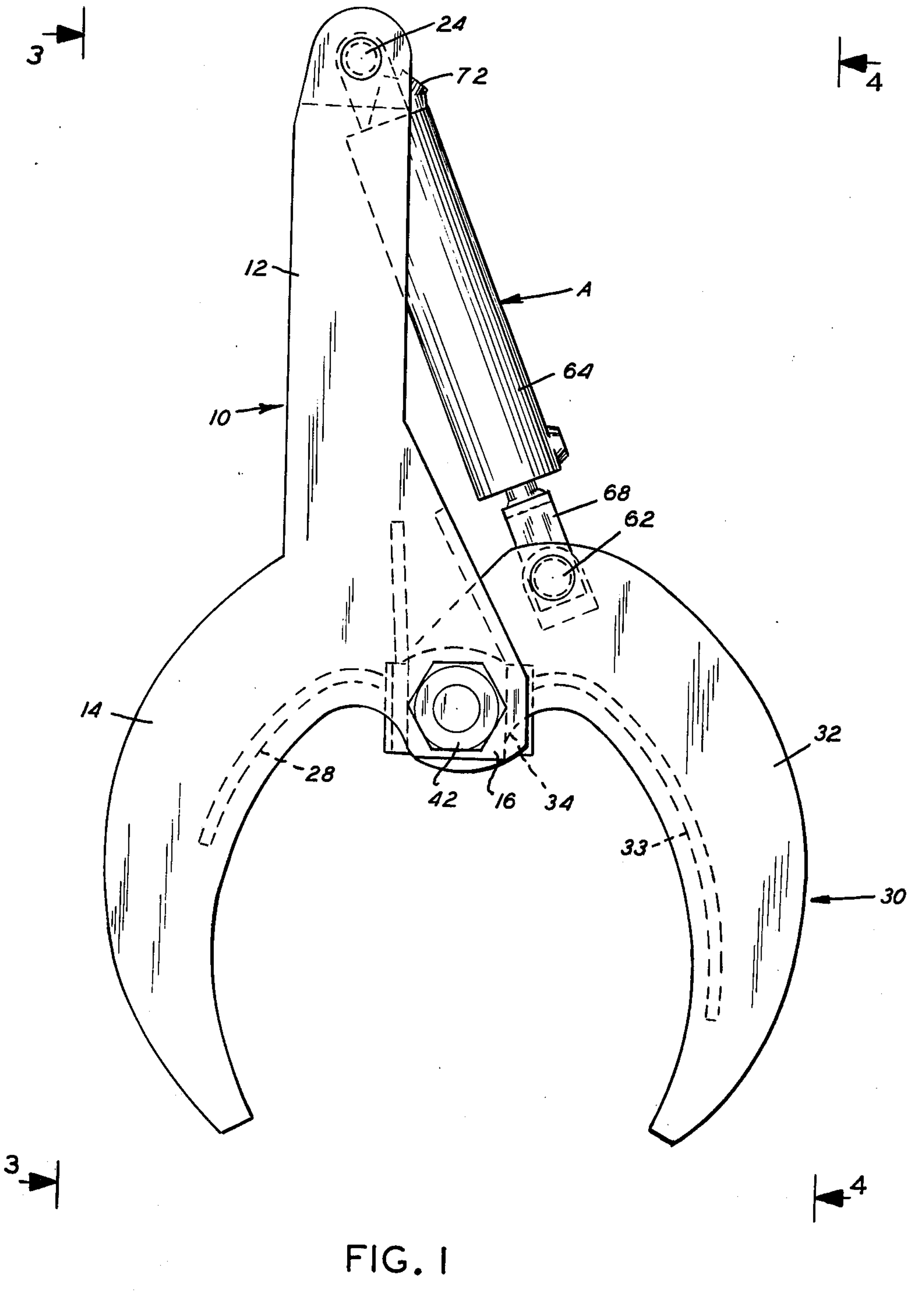
FIG. 1 is a side elevational view of a grapple in open condition and embodying the invention.

Referring to the drawings in detail, the grapple A includes the first stationary jaw member 10 which includes the straight support portion 12 from which extends the arcuate jaw portion 14. The arcuate jaw portion is offset from the longitudinal axis of the straight support portion. At the juncture of the support portion 12 and the jaw portion 14 is formed the integral extension portion 16 thereof which is offset from the longitudinal axis of portion 12, FIG. 1. The numeral 18 designates a secondary stationary jaw which is identical to first jaw 10 and similar parts bear identical numerals but accompanied by a lower case letter *a*.

Formed on the inner surface of the upper end of the first jaw member 10 is the lug 20, and formed on the inner surface of the upper end of the second jaw member 18 is the lug 22. Extended through the upper ends of the support portions 12 and 12*a* and the lugs thereon is the pin 24 secured by the nut 26. Secured to and between the jaw portions 14 and 14*a* is the plate 28 which rigdifies the jaw portions in their spaced relation.

The numeral 30 designates a first movable jaw which includes the arcuate portion 32. The arcuate portion 32 terminates at its upper end in the extension portion 34 which extends at substantially a right angle to the longitudinal axis of the arcuate portion 32. The outer end of the extension portion 34 is formed with a hole 36 through which the threaded pin 38 extends. The pin 38 extends through a hole 40 formed in the extension portion 16 of the first stationary arm 10 and is secured by the nut 42.

Further provided is the second movable jaw 44 which is identical to the first movable jaw and similar parts bear identical numerals but accompanied by a lower case letter *a*. The outer end of the extension portion 34*a* of the second movable jaw 44 is formed with a hole 46 through which the pin 38 extends. The pin 38 extends through a hole 48 formed in the extension portion 16*a* of the second stationary arm 18 with the outer end of the pin secured to the plate 50 secured to the outer surface of the stationary jaw 18 thereby pivotally mounting the jaw 44 on the pin 38. Secured to the sides of the plate 50 are the ears 52 and 54 each formed with a hole 56 which are provided for connection of the grapple with the outer end of a boom not shown.

Secured to the inside surface of each of the movable jaws 30 and 44 at the upper end of the arcuate portions where the same join extension portions 34 and 34*a* are the lugs 58 and 60, respectively. A pin 62 is mounted in the lugs 58 and 60 and the movable jaws 30 and 44.

The numeral 64 designates a single hydraulic ram having the piston rod 66 extended therefrom with the lower end thereof connected to the shackle 68. The shackle 68 is pivotally connected to the pin 62. Secured to the upper end of the ram 64 are the pair of spaced ears which are pivotally mounted on the pin 24 at the upper ends of the stationary jaws. Secured to and between the jaw portions 32 and 32*a* is the arcuate plate 33 which rigidifies the jaw portions in their spaced relation.

Figure 2:
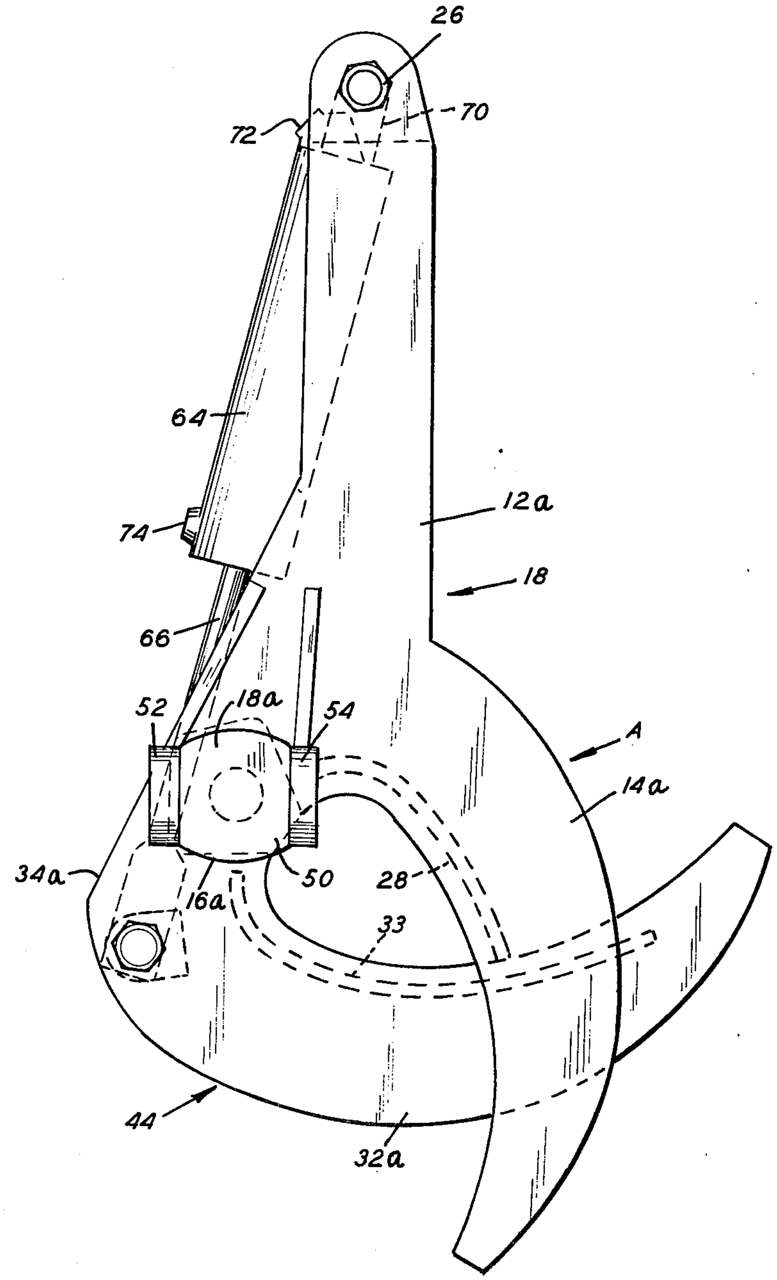
FIG. 2 is a side elevational view opposite to that of FIG. 1 but in fully closed position.
Figure 3:
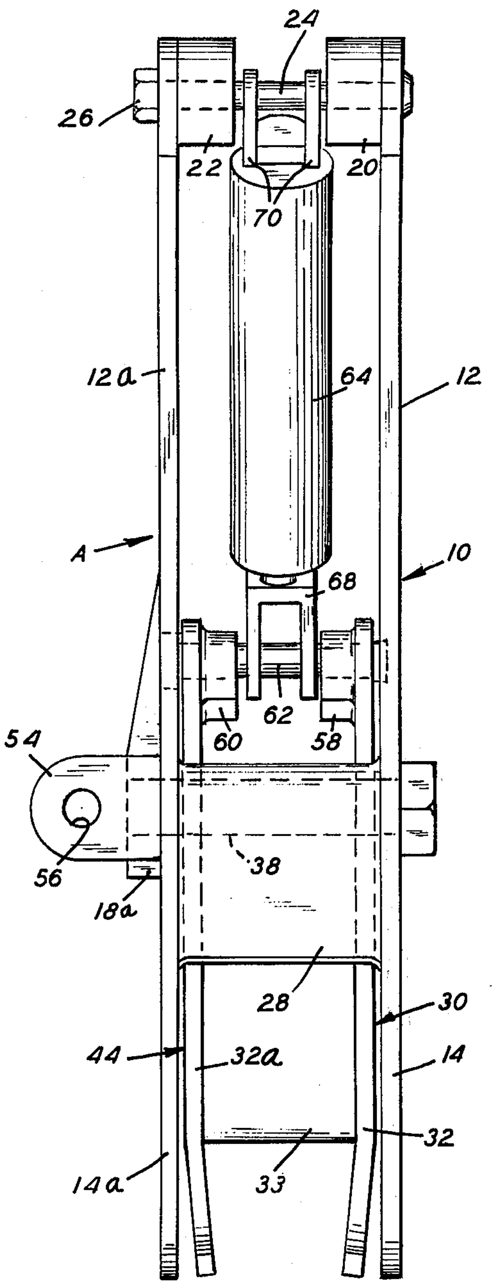
FIG. 3 is an end view taken on the line 3—3 of FIG. 2.
Figure 4:
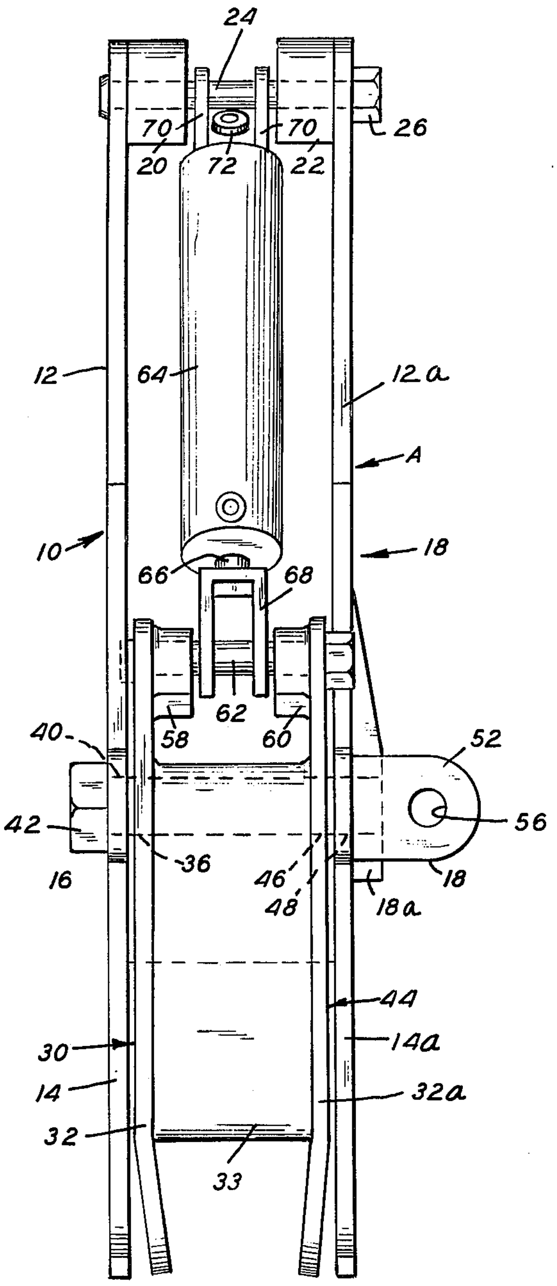
FIG. 4 is an end view taken on the line 4—4 of FIG. 1.

In operation of the grapple, fluid pressure is introduced into the upper end port 72 of the ram 64 and as a result the movable jaw 30 is moved from the position of FIG. 1 to any desired position between that of FIG. 1 and FIG. 2 which is the fully closed position. To open the jaws fluid pressure is introduced into the lower end port 74 with relief of pressure at the upper port 72 by conventional means not shown.

I claim:

1. A grapple comprising:

a. a pair of stationary jaws each including a straight support portion having an upper and a lower end, said lower end terminating in b. an arcuate portion depending from said lower end and offset from the longitudinal axis of said straight support portion and having c. an extension substantially at the juncture of the support portion and the arcuate portion, said extension being short relative to the length of said straight support portion, d. a pair of movable jaws each having an arcuate portion with an upper and lower end, said upper end terminating in e. an extension, said extension being short relative to the length of said arcuate portion, f. a pin pivotally mounting said extension portions of said movable jaws upon said extension portions of said stationary jaws.

g. a single hydraulic ram connected to the upper end of said straight portions of said stationary jaws and the upper ends of said arcuate portions of said movable jaws, and h. means for actuating said ram to move said jaws relative to each other, i. a pair of spaced ears secured to one of said stationary jaws at said pin including j. means for connecting said ears to the end of an operative boom device.

2. The device of claim 1 in which said pair of movable jaws are positioned within said pair of stationary jaws.

* * * * *